US008994931B2

(12) United States Patent
Mori et al.

(10) Patent No.: US 8,994,931 B2

(45) Date of Patent: Mar. 31, 2015

(54) PAPER SHEETS IDENTIFICATION APPARATUS

(75) Inventors: Akira Mori, Nagakute (JP); Yuka Nishizawa, Nagoya (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 13/811,067

(22) PCT Filed: Sep. 14, 2011

(86) PCT No.: PCT/JP2011/005155

§ 371 (c)(1), (2), (4) Date: Jan. 18, 2013

(87) PCT Pub. No.: WO2012/039108

PCT Pub. Date: Mar. 29, 2012

(65) Prior Publication Data

US 2013/0119654 A1 May 16, 2013

(30) Foreign Application Priority Data

Sep. 22, 2010 (JP) ................................ 2010-211551

(51) Int. Cl.

*G06K 9/74* (2006.01)
*B42D 15/00* (2006.01)
*G07D 7/12* (2006.01)

(52) U.S. Cl.

CPC ................ *B42D 15/00* (2013.01); *G07D 7/121* (2013.01)

USPC ............................................................ 356/71

(58) Field of Classification Search

CPC ......... G07D 3/14; G07D 7/00; G07D 7/0006; G07D 7/0013; G07D 7/0026; G07D 7/0033; G07D 7/004; G07D 7/185; G07D 7/0046; G07D 7/0093; G07D 7/04; G07D 7/08; G07D 7/124; G07D 7/164; G07D 7/168

See application file for complete search history.

(56) References Cited

U.S. PATENT DOCUMENTS 5,002,348 A * 3/1991 Wolf ............................ 359/107
5,034,616 A * 7/1991 Bercovitz ...................... 250/556

(Continued)

FOREIGN PATENT DOCUMENTS

CN 2277099 Y 3/1998
CN 1423800 Y 6/2003

(Continued)

*Primary Examiner* — Michael P Stafira

(74) *Attorney, Agent, or Firm* — Volpe and Koenig, P.C.

(57) ABSTRACT

A paper sheets identification apparatus to identify the monetary kinds of paper sheets and to determine whether or not they are genuine provides for a simplified and general purpose detection to be performed irrespectively of the difference in the portions of each of such sheets in which their optical characteristics are arranged. The paper sheets identification apparatus includes a light emitting element; a light receiving element disposed opposite to the light emitting element with the transport path of such sheets interposed therebetween; a plurality of reflective mirrors to conduct light emitted from the light emitting element to the light receiving element; and a guide to move at least one of the reflective mirrors to the direction crosswise to the transport direction of such sheets within a surface in parallel with the carriage surface.

14 Claims, 7 Drawing Sheets

(56) References Cited

U.S. PATENT DOCUMENTS

| | | | | |
|---|---|---|---|---|
| 6,061,121 | A * | 5/2000 | Holl et al. | 356/71 |
| 6,441,891 | B1 * | 8/2002 | Levasseur et al. | 356/71 |
| 7,006,204 | B2 | 2/2006 | Coombs et al. | |
| 7,826,041 | B2 * | 11/2010 | Takeda | 356/71 |
| 2007/0165093 | A1 * | 7/2007 | Oishi | 347/102 |

FOREIGN PATENT DOCUMENTS

| | | | |
|---|---|---|---|
| CN | 2619319 | Y | 6/2004 |
| JP | 09-089538 | A | 4/1997 |
| JP | 2007-141109 | A | 6/2007 |

* cited by examiner

PAPER SHEETS IDENTIFICATION APPARATUS

FIELD OF THE INVENTION

The present invention relates to a paper sheets identification apparatus to detect the optical characteristics of paper sheets such as banknotes and securities and to indentify whether or not they are genuine.

BACKGROUND OF THE INVENTION

A paper sheets identification apparatus to determine whether or not the banknotes are genuine and to discern their types is carried in such paper sheet transaction apparatuses as automatic teller machines (ATMs) used in financial institutions and the like and automatic vending machines, for which identification apparatus various techniques to determine whether or not the banknotes are true have been proposed. As one of such techniques, various types of an optical sensor unit to detect the optical characteristics of paper sheets along with the processing method thereof have been proposed to date.

The optical sensor carried in the paper sheets identification apparatus is largely classified into the following two types. One of those types is a sensor unit generally called 'a point sensor', in which there are disposed a pair of light emitting element and light receiving unit to detect the optic characteristics of paper sheets in transportation. The other is a sensor unit generally called 'a line sensor', which comprises a plurality of linear light receiving elements disposed substantially crosswise to the transportation direction of the paper sheets and a light emitting element unit disposed to emit light substantially along such linear directions of the former to detect the optical characteristics of the paper sheets in transportation. Hereupon, the light emitting element unit, by use of a light emitting element and a light conducting element, is contrived to emit light derived from a small number of light sources universally along such linear directions. As for the point sensor, there is a merit in which such sensor unit is realized as being streamlined in structure and lower in production cost whereas there is a demerit in which the scope to be covered by the same is limited to some of the paper sheets. In comparison, as for the line sensor, it can cover the whole surface of such sheets, so that there is a merit in which a sensor unit higher in detection capability than the point sensor is realized whereas there is a demerit in which its production cost comparatively increases.

Various ideas have been thought up to date for the purpose of keeping such merits intact while minimizing such demerits. For instance, in Patent Document 1 (Japanese Unexamined Patent Application Publication No. 2007-141109), it is proposed that a reflective surface is provided on a portion of the light conducting member and light receiving elements are disposed in plural points opposed to the reflective surface instead of being linearly disposed, thereby, allowing plural portions of the paper sheets to be detected in as streamlined a structure as possible.

SUMMARY OF THE INVENTION

In turn, it depends on a designer' selection in what portions of the paper sheets the optical characteristics effective for determining whether or not they are genuine are arranged, so that it is common that there is difference in such portions according to each of various paper sheets. For example, in the case of banknotes, it is common that such portion of a banknote α of a country A is different from banknote β of a country B and it is often that such portion of the banknote α of the country A is different from that of another banknote γ in the country A.

Thus, conventionally, to detect the optical characteristics arranged in such different portions of the paper sheets, it is required that the line sensor be used to detect the whole surface of such sheets without taking its higher market price into account or the point sensor be used to detect the specific positions of such sheets in considerations of such price and without taking its inferiority in detection performance. In Patent Document 1 as well, because the position of the reflective surface and those of the light receiving elements are predefined, the prior art disclosed therein is hard to take effect for such paper sheets as having the optical characteristics effective for determining whether or not they are true in other portions out of those predefined positions.

According to the present invention, there is provided a paper sheets identification apparatus to identify the monetary kinds of the paper sheets and to determine whether or not they are true, which apparatus comprises a light emitting element; a light receiving element disposed oppositely to the light emitting element with a transport path interposed therebetween; a reflective mirror to conduct light emitted from the light emitting element to the light receiving element; and a guide for the reflective mirror disposed along a transport width direction of the transport path.

The instant invention allows a general purpose sensor not controlled by the portions of the paper sheets, in which their optical characteristics effective for determining whether or not they are true are arranged, to be realized.

DETAILED DESCRIPTION OF THE PREFERRED EMBODIMENTS

Figure 1:
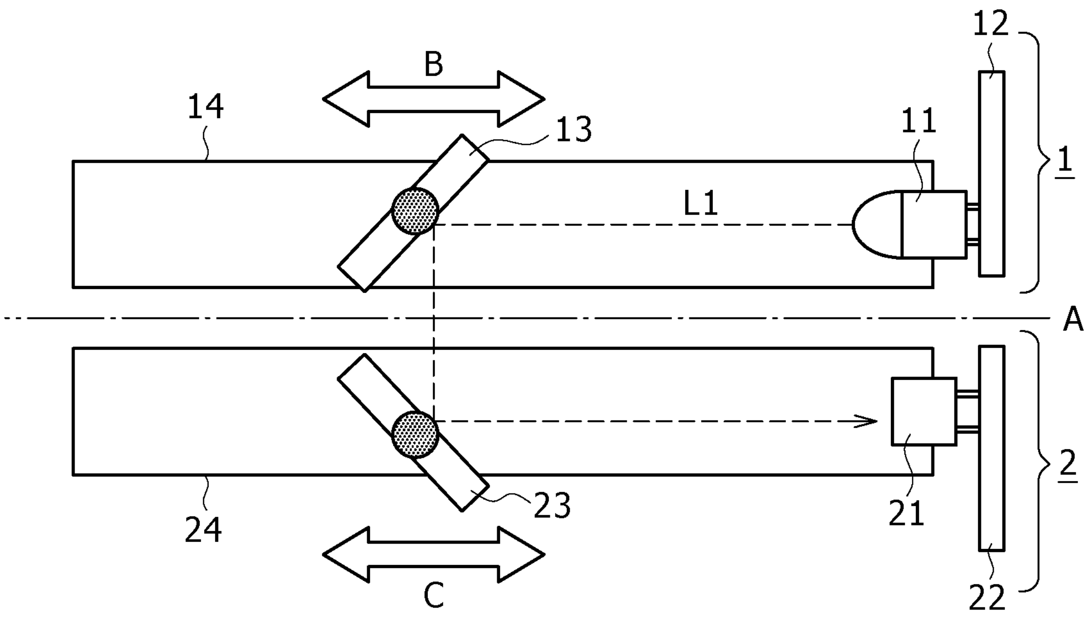
FIG. 1 is a schematic view of the optical sensor unit according to the present invention.

The paper sheets identification apparatus to identify the monetary kinds of such sheets and to determine whether or not they are genuine is embodied in the present invention and is characterized in comprising a light emitting element; a light receiving element disposed opposite to the light emitting element with a transport path interposed therebetween; and a reflective mirror to conduct light emitted from the light emitting element to the light receiving element, and the apparatus preferably includes a guide for the reflective mirror disposed along a transport width direction of the transport path.

According to the present invention, making it possible to dispose the reflective mirror in an optimum position permits the apparatus embodied herein to be used in a general purpose manner irrespective of the portions of the paper sheets in which the optical characteristics are arranged. To note, 'the transport width direction' referred to herein lies in the carriage surface on which the paper sheets are transported and denotes a direction substantially crosswise to that to which such sheets are transported. Further, 'along the transport width direction' referred to herein connotes being substantially parallel with the transport width direction.

Moreover, it is preferred that the reflective mirror be provided with a mechanism by which it can rotate around a revolving shaft disposed along the transport direction of such sheets and be disposed in plurality such that they are opposed to each other with the carriage surface of the transport path interposed therebetween. The provision of such revolving mechanism allows an angle of the reflective mirrors to be adjusted, thereby, enabling only the required diffused light and fluorescent light to be received by the light receiving element.

Furthermore, it is preferred that an optical filter or a condensing lens be provided at least between the light emitting element and the reflective mirror or between the light receiving element and the reflective mirror and the light emitting element be a laser diode. In this way, using the optical filter or the condensing lens permits an output of the optical characteristics to be selectively and efficiently detected.

Further, it is preferred that a diffuser to diffuse light beam emitted from the laser diode be disposed between the light emitting element and the reflective mirror and one part of the reflective mirror be a beam splitter, a half mirror or a photochromic optical element.

Moreover, it is preferred that the reflective mirrors be disposed oppositely to each other with the carriage surface of the transport path interposed therebetween and; be provided with a mechanism disposed along the transport direction of the paper sheets by which they can rotate around a revolving shaft and alternatively take the first posture in which the light beam emitted from the light emitting element is reflected by the reflective mirrors so as to be entered into the light receiving element and the second posture in which they do not intersect with such light beam; and when they take the second posture, the light beam emitted from the light emitting element be reflected by another pair of reflective mirrors so as to be entered into the light receiving element. This allows an angle and a position of the reflective mirrors to be set according to different situations, in which when there are plural portions, in which the optical characteristics are arranged that do not intersect with the light beam emitted from the light emitting element, changing the angle of the reflective mirrors permitting such light beam to be properly received.

Further, it is preferred that a reflective mirror comprise a first reflective portion on the side of the light emitting element and a second reflective portion disposed oppositely to the first reflective portion with the carriage surface interposed therebetween and the second reflective portion is disposed in such a position and with such an angle that only the diffused light and the fluorescent light within the specific range of angles among the diffused lights and the fluorescent lights generated by the light beam emitted from the light emitting element being irradiated onto the paper sheets on the transport path through the first reflective portion, are entered into the light receiving element.

Then, it is preferred that the paper sheets identification apparatus to identify the types of such sheets and to determine whether or not they are true embodied in the present invention comprises a monetary kinds determination section to determine the types of such sheets in transportation; and an optical sensor unit provided with: a light emitting element; a light receiving element disposed oppositely to the light emitting element with the transport path interposed therebetween; a plurality of reflective mirrors to conduct light emitted from the light emitting element to the light receiving element and the positioning of the reflective mirrors be completed according to such kinds determination before the paper sheets reach the optical sensor unit. This arrangement allows the portions of such sheets in which the optical characteristics are arranged according to the types of such sheets to be specified and the positioning of the reflective mirrors to be properly performed. Further, hereupon, it is preferred that a guide for the reflective mirror be provided along the transport width direction of the transport path.

Further, it is preferred that a plurality of the reflective mirrors be disposed oppositely to each other with the carriage surface of the transport path interposed therebetween; be provided with a mechanism disposed along the transport direction of the paper sheets by which they can rotate around a revolving shaft and through the revolving mechanism alternatively take the first posture in which the light beam emitted from the light emitting element is reflected by the reflective mirrors so as to be entered into the light receiving element and the second posture in which they do not intersect with such light beam; and when they take the second posture, the light beam emitted from the light emitting element be reflected by another pair of reflective mirrors so as to be entered into the light receiving element. This allows an angle and a position of the reflective mirrors to be set according to different situations, in which when there are plural portions in which the optical characteristics are arranged, changing the angle of the reflective mirrors permitting such light beam to be properly received.

Further, it is preferred that the reflective mirror comprise a first reflective portion on the side of the light emitting element and a second reflective portion disposed oppositely to the first reflective portion with the carriage surface of the transport path interposed therebetween and the second reflective portion be disposed in such a position and with such an angle that only the diffused light and the fluorescent light within the specific range of angles among the diffused lights and the fluorescent lights generated by the light beam emitted from the light emitting element being irradiated onto the paper sheets on the transport path through the first reflective mirror, are entered into the light receiving element.

First Embodiment

The first embodiment according to the present invention is explained with reference to FIG. 1, in which it is shown that a light projection unit 1 and a light receiving unit 2 are oppositely disposed to each other with a carriage center surface A indicated with a chain line interposed therebetween. With regard to the sheet in which FIG. 1 is depicted, the paper sheets are transversely transported to a space between the light projection unit 1 and the light receiving unit 2.

The light projection unit 1 comprises at least a light emitting element 11; a light emitting circuit 12; a reflective mirror 13 corresponding to a reflective section to reflect light emitted from the light emitting element 11; and a guide 14 provided over the carriage surface, on which the paper sheets are transported, and in the direction (transport width direction) substantially crosswise to the transport direction or in the direction of the arrow B shown in FIG. 1 along the carriage center surface A. Further, the light receiving unit 2 comprises at least a light receiving element 21; a light receiving circuit 22; a reflective mirror 23 corresponding to a reflective mirror; and a guide 24 provided over the carriage surface, on which the paper sheets are transported, and in the direction (transport width direction) substantially crosswise to the transport direction or in the direction of the arrow C shown in FIG. 1 along the carriage center surface A.

The reflective mirror 13 is preliminarily disposed in a position where the optical characteristics of the paper sheets effective for determining whether or not they are true pass through and the reflective mirror 23 is preliminarily disposed in a position opposed to the reflective mirror 13 with the carriage center surface A interposed therebetween. Thus, generally speaking, the positions in which the reflective mirrors 13 and 23 are disposed are rendered different according to the types of such sheets in transportation, so that they can be disposed in an optimum position according to each type of such sheets. The light beam L1 emitted from the light emitting element 11, as indicated with a broken line shown in FIG. 1, is reflected by the reflective mirrors 13 and 23 so as to be entered into the light receiving element 21. This arrangement allows a general purpose sensor to be realized irrespectively of the portions of such sheets in which their optical characteristics effective for determining whether or not they are true are arranged.

Then, the first embodiment of the present invention is explained with reference to FIG. 2, in which a light projection unit 1 and a light receiving unit 2 are oppositely disposed to each other with a carriage center surface A indicated with a chain line interposed therebetween. With regard to the sheet in which FIG. 2 is depicted, the paper sheets are transversely transported to a space between the light projection unit 1 and the light receiving unit 2.

Figure 2:
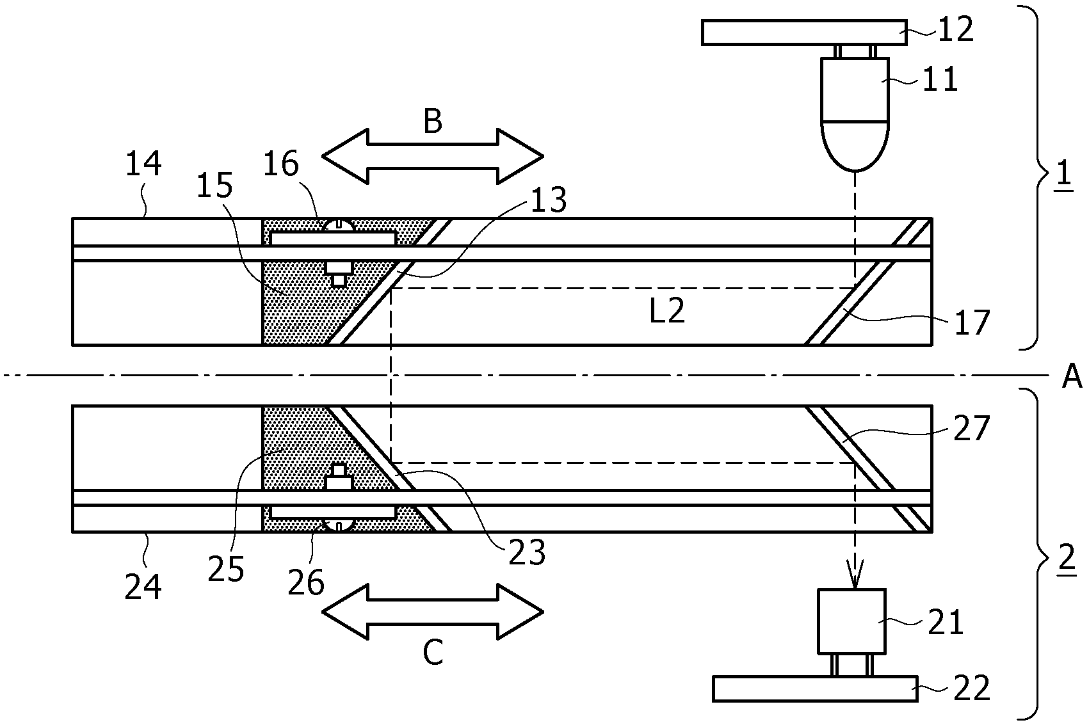
FIG. 2 is a schematic view to explain the first embodiment of the present invention.

The light projection unit 1 comprises at least a light emitting element 11; a light emitting circuit 12; a reflective mirror 13 corresponding to a reflective section to reflect light emitted from the light emitting element 11; a guide 14 provided over the carriage surface, on which the paper sheets are transported, and in the direction (transport width direction) substantially crosswise to the transport direction or in the direction of the arrow B shown in FIG. 2 along the carriage center surface A; a reflective block 15 to hold the reflective mirror 13 in place; a screw 16 to fix the reflective block 15 to the guide 14 with; and another reflective mirror 17 fixed on one end of the guide 14 to conduct light beam emitted from the light emitting element 11 to the reflective mirror 13. The light receiving unit 2 comprises at least a light receiving element 21; a light receiving circuit 22; a reflective mirror 23 corresponding to a reflective mirror; a guide 24 provided over the carriage surface, on which the paper sheets are transported, and in the direction (transport width direction) substantially crosswise to the transport direction or in the direction of the arrow C shown in FIG. 2 along the carriage center surface A; a reflective block 25 to hold the reflective mirror 23 in place; a screw 26 to fix the reflective block 25 to the guide 24 with; and another reflective mirror 27 fixed on one end of the guide 24 to conduct light beam reflected by the reflective mirror 23 to the light receiving element 21.

Upon the apparatus being assembled for production, according to the banknotes of a country for which such production is directed, the reflective mirror 13 is disposed in a position where the optical characteristics of such banknotes can be optimally detected and the reflective block 15 is fixed to the guide 14 with the screw 16. Then, the reflective mirror 23 is moved to a position opposed to the reflective mirror 13 with the carriage center surface A interposed therebetween and the position of the former is adjusted such that it can generate an optimum output. Thereafter, the reflective block 25 is fixed to the guide 24 with the screw 26.

The light beam L2 emitted from the light emitting element 11, as indicated with a broken line shown in FIG. 2, is reflected by the reflective mirrors 17, 13, 23 and 27 so as to be entered into the light receiving element 21. Since a detection area is readily prepared in a position according to each type of different paper sheets, it allows a general purpose sensor to be realized in a streamlined structure and with a lower production cost.

Moreover, for instance, when the design of a banknote is changed after the shipping of the apparatus so that the portions of the banknote in which the optical characteristics effective for determining whether or not it is true are arranged have been modified in the destination where they have been shipped, all you have to do is to take off the screw 16 of the fixed reflective block 15 and that 26 of the fixed reflective block 25 so as to readjust the positions of those blocks as desired, thereby, enabling the assembly personnel to quickly respond to the modification in design of the banknote unpredicted at the time of such shipping.

Otherwise, preliminarily providing a plurality of screw holes through the guides 14 and 24 such that the users can shift those blocks 15 and 25 to any one of those holes permits just one instruction on which holes shall be selected for maintenance and modification to be given thereto.

Second Embodiment

Subsequently, the second embodiment according to the present invention is explained with reference to FIG. 3, in which the light projection unit 1 and the light receiving unit 2 are oppositely disposed to each other with the carriage center surface A shown with a chain line therein interposed therebetween. With regard to the sheet in which FIG. 3 is depicted, the paper sheets are transversely transported to a space between the light projection unit 1 and the light receiving unit 2.

Figure 3:
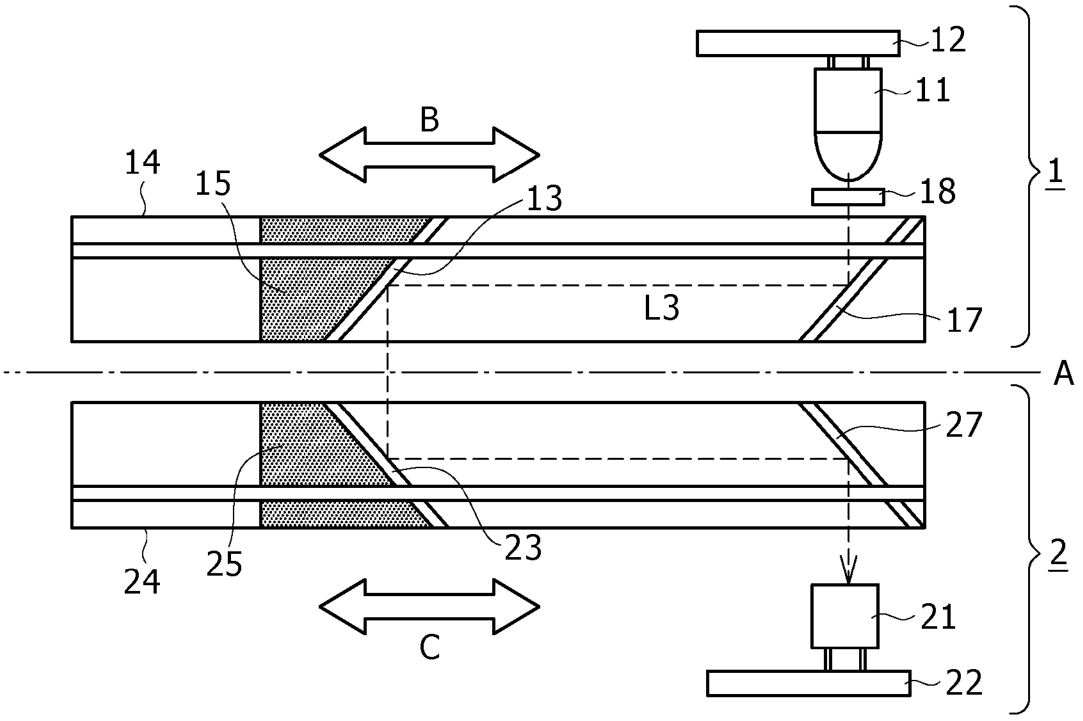
FIG. 3 is a schematic view to explain the second embodiment of the present invention.

The light projection unit 1 comprises at least a light emitting element 11; a light emitting circuit 12; a reflective mirror to reflect light emitted from the light emitting element 11; a guide 14 provided over the carriage surface, on which the paper sheets are transported, and in the direction (transport width direction) substantially crosswise to the transport direction or in the direction of the arrow B shown in FIG. 3 along the carriage center surface A; a reflective block 15 to hold the reflective mirror 13 in place; another reflective mirror 17 fixed on one end of the guide 14 to conduct light beam emitted from the light emitting element 11 to the reflective mirror 13; and a driving section (not shown in the drawing) to drive the reflective block 15 holding the reflective mirror 13 in place to a certain position along the guide 14. In the present embodiment, a laser diode is particularly adopted for the light emitting element 11 and a diffuser 18 is provided between the light emitting element 11 and the reflective mirror 17 in addition to the afore-mentioned structural arrangement. The provision of the diffuser 18 leads to thickening a flux of light beam so as to allow an optical sensor unit more robust against fluctuation in a detected output caused by the displacement of the light beam L3 brought about by a precision error in the positioning of the respective structural features to be realized.

The light receiving unit 2 comprises at least a light receiving element 21; a light receiving circuit 22; a reflective mirror 23; a guide 24 provided over the carriage surface, on which the paper sheets are transported, and in the direction (transport width direction) substantially crosswise to the transport direction or in the direction of the arrow C shown in FIG. 3 along the carriage center surface A; a reflective block 25 to hold the reflective mirror 23 in place; another reflective mirror 27 fixed on one end of the guide 24 to conduct light beam reflected by the reflective mirror 23 to the light receiving element 21; and a driving section (not shown in the drawing) to drive the reflective bock 25 holding the reflective mirror 23 in place to a certain position along the guide 24.

In the present embodiment, the driving section on the light receiving side and that on the light projection side share some components so that the reflective blocks 15 and 25 move substantially in synchronization such that they are constantly opposed to each other with the carriage center surface A interposed therebetween, but they may well be driven independently from each other with separate driving sections. In this case, the number of the parts increases in comparison with the present embodiment so that there is disadvantage in that a lower production cost is not realized whereas there is advantage in that the latitude with which those blocks are driven is enhanced.

The light beam L3 emitted from the light emitting element 11, as shown with a broken line in FIG. 3, is reflected by the reflective mirrors 17, 13, 23 and 27 so as to be entered into the light receiving element 21.

As with the paper sheets identification unit provided with the optical unit according to the present embodiment, the types of such sheets e.g., the monetary kinds of banknotes may well be determined with a separately arranged sensor (not shown in the drawing) in use and on the basis of such determination such driving control may well be performed that the reflective mirrors 13 and 23 are moved through the guides 14 and 24 to the positions where the optical characteristics predefined for each banknote can be optimally detected before the banknotes reach the optical unit, in which whether or not such sheets are true is determined in the optimal positions according to each banknote. Summing up, a detection area is readily selected according to the result of such determination and whether or not they are true can be optimally obtained with such a streamlined sensor arrangement whose production cost is lower as mentioned above.

Further, as another processing method, when the genuineness of such sheets is doubted at the first identification, a detection area may well be shifted and at the resulting detection area whether or not they are true may well be afresh determined during the second identification, thereby, enabling counterfeiting generally called ‘altered notes’ in which a part of genuine paper sheets is forged to be detected. Further, instead of moving the reflective mirrors, in order to achieve the effect brought by the present embodiment, a means for moving either the light emitting element 11 or the light receiving element 21 over the carriage surface, on which such sheets are transported, and along the direction (transport width direction) substantially crosswise to the transport direction may well be provided.

In the above two embodiments, detection is feasible in response to the optical characteristics arranged in different portions of paper sheets, but the capability to detect such characteristics at the plural positions respectively along the arrow B depends on that of the driving section (not shown in the drawings) to aptly move the reflective mirrors 13 and 23 while such sheets are being transported, so that there is a limit in the detection capability achieved by the arrangements described in the above two embodiments.

Third Embodiment

Figure 4:
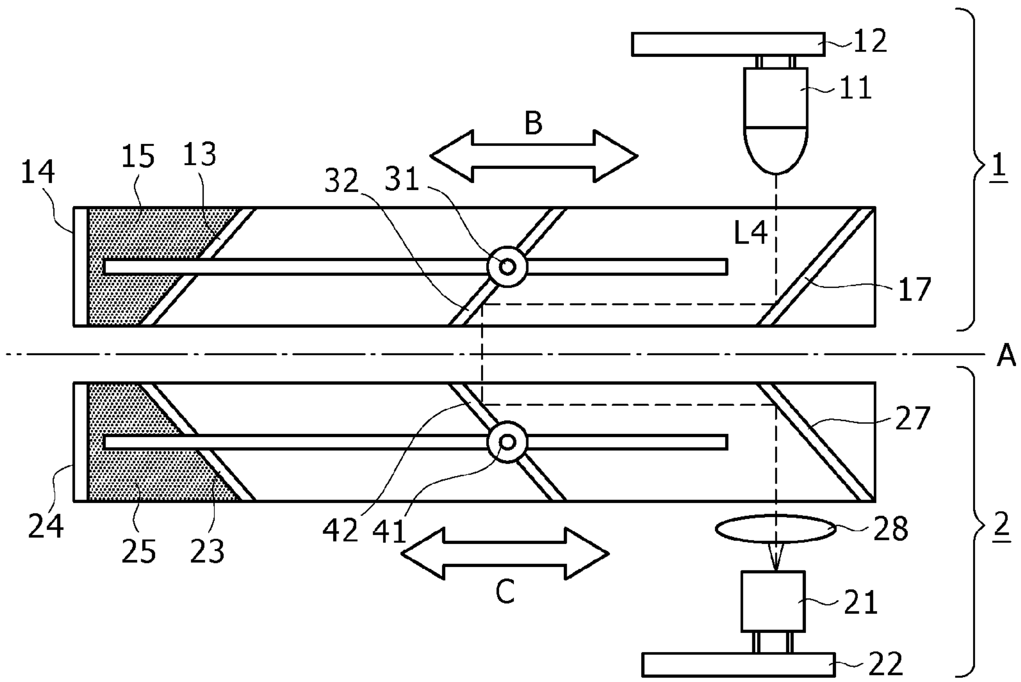
FIG. 4 is a schematic view to explain the first posture of the reflective mirrors according to the third embodiment of the present invention.
Figure 5:
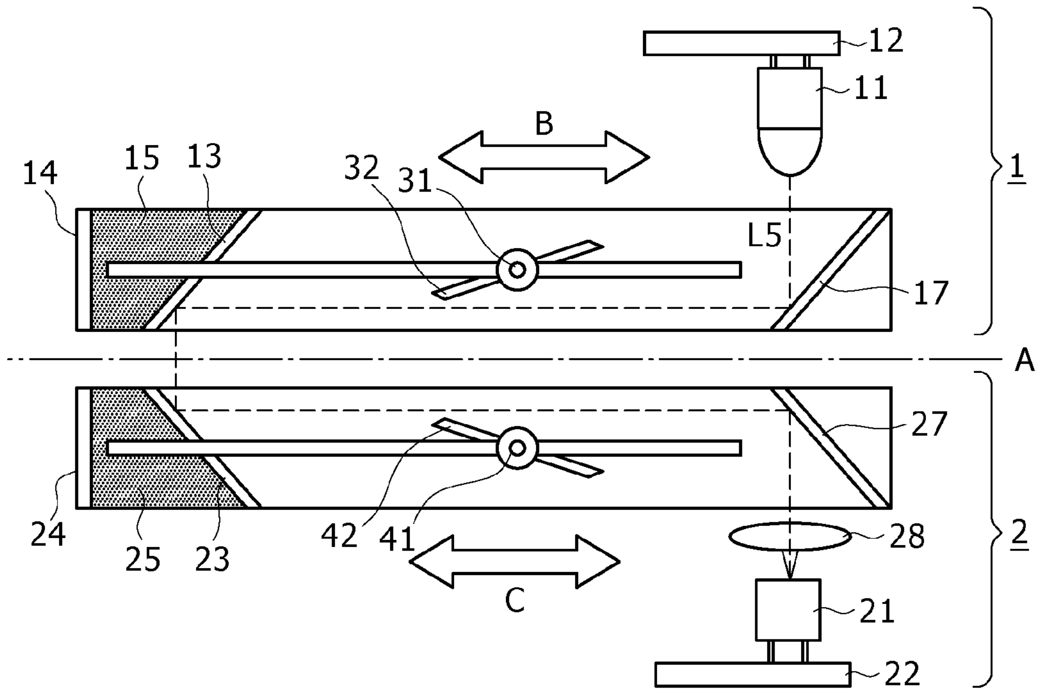
FIG. 5 is a schematic view to explain the second posture of the reflective mirrors according to the third embodiment of the present invention.

In the third embodiment according to the present invention, such arrangement is described as enabling such optical characteristics to be detected at the plural positions respectively along the arrow B. The present embodiment is explained with reference to FIGS. 4 and 5, in which FIG. 4 is a schematic view to explain the first posture of the reflective mirrors and FIG. 5 is a schematic view to explain their second posture according to the present embodiment. As shown in FIGS. 4 and 5, a light projection unit 1 and a light receiving unit 2 are disposed oppositely to each other with a carriage center surface A shown with a chain line in the drawings interposed therebetween. With regard to the sheets in which FIGS. 4 and 5 are depicted, the paper sheets are transversely transported to a space between the light projection unit 1 and the light receiving unit 2.

The light projection unit 1 comprises at least a light emitting element 11; a light emitting circuit 12; a reflective mirror 13; a guide 14 provided over the carriage surface, on which the paper sheets are transported, and in the direction (transport width direction) substantially crosswise to the transport direction or in the direction of the arrow B shown in FIGS. 4 and 5 along the carriage center surface A; a reflective block 15 to hold the reflective mirror 13 in place; another reflective mirror 17 fixed on one end of the guide 14 to conduct light beam emitted from the light emitting element 11 towards the reflective mirror 13; a revolving shaft 31 disposed between the reflective mirrors 13 and 17 and being movable along the arrow B; another reflective mirror 32 rotatable around the revolving shaft 31; a rotational driving section (not shown in the drawings) to rotate the revolving shaft 31 to a certain degree; and a driving section (not shown in the drawings) to drive the revolving shaft 31 and the reflective block 15 synchronously or independently to a certain position along the guide 14.

The light receiving unit 2 comprises at least a light receiving element 21; a light receiving circuit 22; a reflective mirror 23; a guide 24 provided over the carriage surface, on which the paper sheets are transported, and in the direction (transport width direction) substantially crosswise to the transport direction or in the direction of the arrow C shown in FIGS. 4 and 5 along the carriage center surface A; a reflective block 25 to hold the reflective mirror 23 in place; another reflective mirror 27 fixed on one end of the guide 24 to conduct light beam reflected by the reflective mirror 23 or a reflective mirror 42 as subsequently described to the light receiving element 21; a revolving shaft 41 disposed between the reflective mirrors 23 and 27 and being movable along the arrow C; another reflective mirror 42 rotatable around the revolving shaft 41; a rotational driving section (not shown in the drawings) to rotate the revolving shaft 41 to a certain degree; and a driving section (not shown in the drawings) to drive the revolving shaft 41 and the reflective block 25 to a certain position along the guide 24. In the present embodiment, in addition to the above structural arrangement, a condensing lens is disposed between the reflective mirror 27 and the light receiving element 21 such that the output of the optical characteristics can be detected in an efficient manner.

In the present embodiment, in the same way as the second embodiment, the driving section on the light receiving side and that on the light projection side share some components so that the reflective blocks 15 and 25 move substantially in synchronization such that they are constantly opposed to each other through the carriage center surface A, but they may well be driven independently from each other with separate driving sections, in which case the resulting merit and demerit are the same as described in the second embodiment. While the reflective mirrors 32 and 42 are being disposed such that they take the first posture shown in FIG. 4, the light beam L4 emitted from the light emitting element 11, as shown with a broken line in FIG. 4, is reflected by the reflective mirrors 17, 32, 42 and 27 so as to be entered into the light receiving element 21.

On the other hand, while the reflective mirrors 32 and 42 are being disposed such that they take the second posture shown in FIG. 5, the light beam L5 emitted from the light emitting element 11, as shown with a broken line in FIG. 5, is reflected by the reflective mirrors 17, 13, 23 and 27 so as to be entered into the light receiving element 21. Making the reflective mirrors 32 and 42 rotate so as to take selectively the first and second postures is mechanically easier than making them reciprocally move through the plural positions with the driving section (not shown in the drawings) in use. Thus, adopting the structural arrangement as described in the present embodiment allows the optical characteristics arranged in the respective different portions of paper sheets to be detected while such sheets are being transported.

Fourth Embodiment

Figure 6:
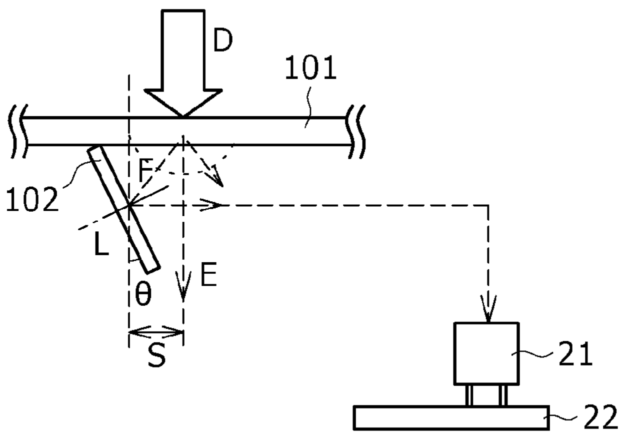
FIG. 6 is a schematic view to explain the dispositional principle of the reflective mirrors according to the fourth embodiment of the present invention.
Figure 7:
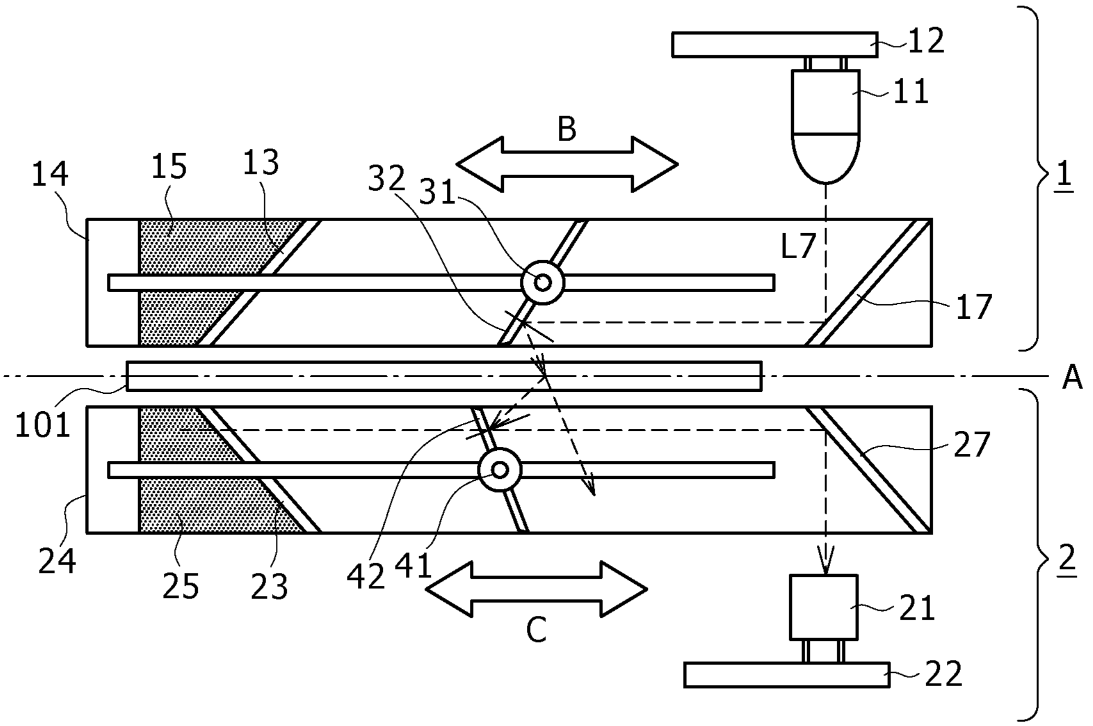
FIG. 7 is a schematic view to explain the fourth embodiment of the present invention.

Further, the fourth embodiment according to the present invention is explained with reference to FIGS. 6 and 7, in which FIG. 6 is a schematic view to explain the dispositional principle of the reflective mirrors according to the present embodiment and FIG. 7 is a schematic view to explain the present embodiment.

With reference to FIG. 6, when an incident light indicated with the arrow D is entered into the transported paper sheet 101, most of it is transmitted through substantially in the same direction as the arrow D as indicated with the arrow E. Provided that the reflective mirror 102 is disposed such that it is deviated by a distance 's' from the incident light D so that it makes an angle θ with the direction of the incident light D, the light beam that enters into the light receiving element 21 is not the transmitted light indicated with the arrow E, but is limited to a diffused light F among those diffused by the transported paper sheet 101, an angle that such diffused light makes with the transmitted light indicated with the arrow E being within the limited range of angles in the vicinity of $(\pi/2-2\theta)$. The distance 's' to be deviated depends on the dimension and so forth of the reflective mirror 102, which distance can be readily found by performing a simple light beam tracing calculation.

As mentioned above, properly choosing an angle that the reflective mirror makes with the direction of the incident light and a distance by which the former is deviated from the latter permits the diffused lights generated upon the incident light being transmitted through the transported paper sheet 101 to be selectively received. Then, with reference to FIG. 7, the fourth embodiment according to the present invention employing the above-mentioned principle is in detail explained.

As shown in FIG. 7, a light projection unit 1 and a light receiving unit 2 are oppositely disposed to each other with the carriage center surface A shown with a chain line therein interposed therebetween. With regard to the sheet in which FIG. 7 is depicted, the paper sheets are transversely transported to a space between the light projection unit 1 and the light receiving unit 2.

The light projection unit 1 comprises at least a light emitting element 11; a light emitting circuit 12; a reflective mirror 13; a guide 14 provided over the carriage surface, on which the paper sheets are transported, and in the direction (transport width direction) substantially crosswise to the transport direction or in the direction of the arrow B shown in FIG. 7 along the carriage center surface A; a reflective block 15 to hold the reflective mirror 13 in place; another reflective mirror 17 fixed on one end of the guide 14 to conduct light beam emitted from the light emitting element 11 towards the reflective mirror 13; a revolving shaft 31 disposed between the reflective mirrors 13 and 17 and being movable along the arrow B; another reflective mirror 32 rotatable around the revolving shaft 31; a rotational driving section (not shown in the drawing) to rotate the revolving shaft 31 to a certain degree; and a driving section (not shown in the drawing) to drive the revolving shaft 31 and the reflective block 15 synchronously or independently to a certain position along the guide 14.

The light receiving unit 2 comprises at least a light receiving element 21; a light receiving circuit 22; a reflective mirror 23; a guide 24 provided over the carriage surface, on which the paper sheets are transported, and in the direction (transport width direction) substantially crosswise to the transport direction or in the direction of the arrow C shown in FIG. 7 along the carriage center surface A; a reflective block 25 to hold the reflective mirror 23 in place; another reflective mirror 27 fixed on one end of the guide 24 to conduct light beam reflected by the reflective mirror 23 or a reflective mirror 42 as subsequently described to the light receiving element 21; a revolving shaft 41 disposed between the reflective mirrors 23 and 27 and being movable along the arrow C; another reflective mirror 42 rotatable around the revolving shaft 41; a rotational driving section (not shown in the drawing) to rotate the revolving shaft 41 to a certain degree; and a driving section (not shown in the drawing) to drive the revolving shaft 41 and the reflective block 25 to a certain position along the guide 24.

Arranging such that a horizontal distance with regard to FIG. 7 between the reflective mirrors 32 and 42 is made definitive and disposing them such that an angle that their respective mirror surfaces make with the normal direction of the carriage center surface A is made definitive allows an angle of the incident light or the light beam L7 transmitted through the transported paper sheet 101 to be made definitive and only the diffused light within the limited range of angles to be received. Such definitive values are predefined according to the kinds of optical characteristics of the paper sheets.

In the present embodiment, the detection of the diffused light is exemplified, but when the paper sheets are provided with fluorescent characteristics, of course, it is also feasible to efficiently detect such characteristics by selectively rendering the central emission wavelength of the light emitting element substantially the same as the excitation wavelength of such characteristics of such sheets as well as disposing a selective optical filter to cut emission wavelength and transmit fluorescent light between the light receiving element 21 and the reflective mirror 27.

Figure 8:
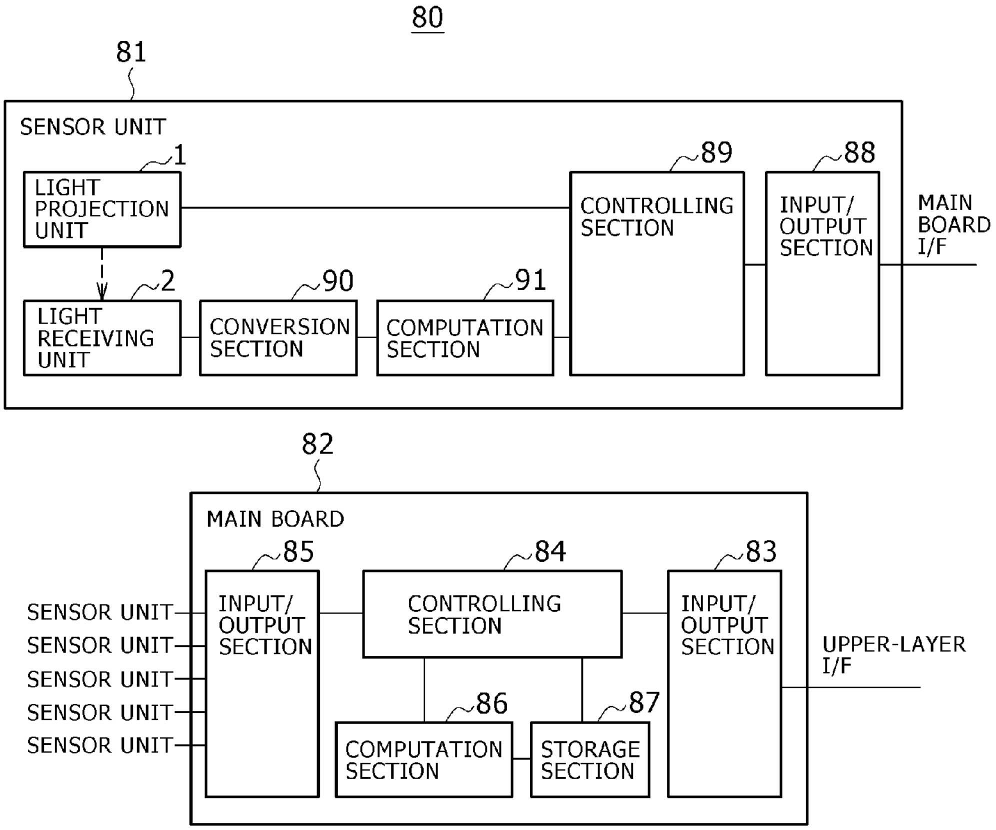
FIG. 8 is a schematic view showing the internal structure of the paper sheets identification section (apparatus) according to the present invention.

Hereupon, the structural arrangement of the paper sheets identification section 80 embodied in the present invention is shown in FIG. 8, which section mainly comprises a main board 82 and at least one sensor unit 81 and identifies the types of the paper sheets such as the transported banknotes. The main board 82 comprises at least a controlling section 84 coupled to an upper-layer banknote module through an input/output section 83 to control the operation of the section 80; an input/output section to input/output a signal from/to the sensor unit 81; a computation section 86 to compute the signals inputted/outputted through the input/output section 85; and a storage section 87 to store a computation result. Hereupon, the sensor unit 81 comprises another input/output section 88 to output a signal to the main board 82 and to input a signal from the main board 82; a controlling section 89 to control the detection operation of the sensor unit 81; a light projection unit 1 to irradiate a certain light onto the paper sheets; a light receiving unit 2 to detect the irradiated light; a conversion section 90 to e.g. amplify/remove the noise of the signal detected by the light receiving unit 2; and a computation section 91 to subject the signal converted by the conversion section to computation. It shall be appreciated that the present invention is not limited to the preferred embodiments described above and may be modified into various manners within the scope of the accompanying patent claims.

What is claimed is:

1. A paper sheets identification apparatus to identify monetary kinds of paper sheets and whether or not the sheets are genuine, the apparatus comprising:
- a light emitting element;
- a light receiving element disposed opposite to the light emitting element with a transport path interposed there between;
- a reflective mirror to conduct light emitted from the light emitting element to the light receiving element;
- a guide for the reflective mirror provided along a transport width direction of the transport path; and
- wherein the reflective mirror is fixable at a certain position of the guide.

2. The paper sheets identification apparatus according to claim 1, wherein the reflective mirror is provided with a mechanism allowing it to rotate around a revolving shaft provided along a transport direction of the paper sheets.

3. The paper sheets identification apparatus according to claim 1, wherein a plurality of the reflective mirrors are disposed such that they are opposed to each other with a carriage surface of the transport path interposed therebetween.

4. The paper sheets identification apparatus according to claim 1, wherein an optical filter is provided at least one of between the light emitting element and the reflective mirror and between the light receiving element and the reflective mirror.

5. The paper sheets identification apparatus according to claim 1, wherein the light emitting element is a laser diode.

6. The paper sheets identification apparatus according to claim 5, wherein a diffuser to diffuse light beam emitted from the laser diode is provided between the light emitting element and the reflective mirror.

7. The paper sheets identification apparatus according to claim 1, wherein a condensing lens is provided at least one of between the light emitting element and the reflective mirror and between the light receiving element and the reflective mirror.

8. The paper sheets identification apparatus according to claim 1, wherein one part of the reflective mirror is one of a beam splitter, a half mirror and a photochromic optical element.

9. The paper sheets identification apparatus according to claim 1, wherein the reflective mirrors are disposed such that they are opposed to each other with the carriage surface of the transport path interposed there between and provided with the mechanism allowing them to rotate around the revolving shaft provided along the transport direction of the paper sheets, and wherein the reflective mirrors through the mechanism alternatively take a first position in which the light beam emitted from the light emitting element is reflected by the reflective mirrors so as to enter into the light receiving element and a second position in which they do not intersect with the light beam emitted from the light emitting element.

10. The paper sheets identification apparatus according to claim 9, wherein when the reflective mirrors take the second position in which they do not intersect with the light beam emitted from the light emitting element, the light beam is reflected by another pair of reflective mirrors so as to enter into the light receiving element.

11. The paper sheets identification apparatus according to claim 1, wherein the reflective mirror comprises a first reflective portion found on a side of the light emitting element and a second reflective portion disposed such that it is opposed to the first reflective portion with the carriage surface of the transport path interposed therebetween, and wherein the second reflective portion is disposed in such a position and with such an angle that only one of a diffused light and a fluorescent light within a specific range of angles among the diffused lights and the fluorescent lights generated by irradiating the light beam emitted from the light emitting element onto the paper sheets on the transport path enters into the light receiving element.

12. A paper sheets identification apparatus to identify kinds of paper sheets and whether or not the sheets are genuine, the apparatus comprising:
- a monetary types determination section to determine the types of the paper sheets; and
- an optical sensor unit including:
  - a light emitting element;
  - a light receiving element disposed opposite to the light emitting element with a transport path interposed there between; and
  - a reflective mirror to conduct light emitted from the light emitting element to the light receiving element;
- a guide for the reflective mirror provided along a transport width direction of the transport path wherein a reflective mirror is fixable at a certain position of the guide, and a positioning of the reflective mirror is completed according to a result from the determination section before the paper sheets reach the optical sensor unit.

13. The paper sheets identification apparatus according to claim 12,
- wherein a plurality of the reflective mirrors are disposed such that they are opposed to each other with a carriage surface of the transport path interposed there between and provided with a mechanism allowing them to rotate around a revolving shaft provided along a transport direction of the paper sheets, and
- wherein the reflective mirrors through the mechanism alternatively take a first position in which a light beam emitted from the light emitting element is reflected by the reflective mirrors so as to be entered into the light receiving element and a second position in which they do not intersect with the light beam.

14. The paper sheets identification apparatus according to claim 12,
- wherein the reflective mirror includes a first reflective portion found on a side of the light emitting element and a second reflective portion disposed such that it is opposed to the first reflective portion with the carriage surface of the transport path interposed there between, and
- wherein the second reflective portion is disposed in such a position and with such an angle that only one of a diffused light or a fluorescent light, within a specific range of angles among the diffused lights or the fluorescent lights generated by irradiating the light beam emitted from the light emitting element onto the paper sheets on the transport path, is entered into the light receiving element.

* * * * *